(12) United States Patent
Ogasawara et al.

(10) Patent No.: US 9,601,743 B2
(45) Date of Patent: Mar. 21, 2017

(54) ELECTRIC WIRE ROUTING STRUCTURE FOR BUS BAR MODULE

(71) Applicants: YAZAKI CORPORATION, Tokyo (JP); TOYOTA JIDOSHA KABUSHIKI KAISHA, Toyota-shi, Aichi (JP)

(72) Inventors: Shigeyuki Ogasawara, Kakegawa (JP); Shinsuke Azuma, Kosai (JP); Shinichi Yanagihara, Kakegawa (JP); Michio Ota, Kakegawa (JP); Akihiro Kosaki, Toyota (JP); Isao Nakagawa, Toyota (JP)

(73) Assignees: Yazaki Corporation, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/424,528

(22) PCT Filed: Aug. 29, 2013

(86) PCT No.: PCT/JP2013/073220
§ 371 (c)(1),
(2) Date: Feb. 27, 2015

(87) PCT Pub. No.: WO2014/034809
PCT Pub. Date: Mar. 6, 2014

(65) Prior Publication Data
US 2015/0221923 A1    Aug. 6, 2015

(30) Foreign Application Priority Data

Aug. 30, 2012 (JP) ................................ 2012-189956

(51) Int. Cl.
*H02G 5/00* (2006.01)
*H01M 2/20* (2006.01)
(Continued)

(52) U.S. Cl.
CPC ......... *H01M 2/206* (2013.01); *H01M 2/1077* (2013.01); *H01M 10/482* (2013.01); *H02G 5/02* (2013.01); *H01M 2220/20* (2013.01)

(58) Field of Classification Search
CPC ....... H01R 11/288; H01R 25/16; H01M 2/20; H01M 2/206; H01M 10/425; H01M 10/482; H01M 2220/20; H02G 5/00; H02G 5/02
(Continued)

(56) References Cited

U.S. PATENT DOCUMENTS

| 6,935,020 B2* | 8/2005 | Ikeda ................. H01M 2/1077 29/825 |
| 2002/0102457 A1 | 8/2002 | Oogami et al. |

(Continued)

FOREIGN PATENT DOCUMENTS

| CN | 101662054 A | 3/2010 |
| JP | 2001-266825 A | 9/2001 |

(Continued)

OTHER PUBLICATIONS

Definition of "lead" from www.thefreedictionary.com.*
(Continued)

*Primary Examiner* — Chau N Nguyen
*Assistant Examiner* — Roshn Varghese
(74) *Attorney, Agent, or Firm* — Sughrue Mion, PLLC

(57) ABSTRACT

Provided are: a first-group accommodation part (21) and a second-group accommodation part (22) in each of which accommodation parts (2) each of which accommodates at least one of a bus bar (3), a terminal (4), and an electric wire (5) connected to the terminal (4) are arranged; a linkage part (8) linking the first-group accommodation part (21) and the second-group accommodation part (22) to each other; and an (Continued)

electric wire routing part (9) provided in the linkage part (8) and accommodating the electric wires (5).

2 Claims, 10 Drawing Sheets

(51) Int. Cl.
 *H01M 2/10* (2006.01)
 *H02G 5/02* (2006.01)
 *H01M 10/48* (2006.01)
(58) Field of Classification Search
 USPC ........................................................ 174/70 B
 See application file for complete search history.

(56) References Cited

U.S. PATENT DOCUMENTS

| | | | | |
|---|---|---|---|---|
| 2004/0043663 | A1* | 3/2004 | Ikeda | H01M 2/206 |
| | | | | 439/627 |
| 2010/0052692 | A1 | 3/2010 | Yano et al. | |
| 2011/0064986 | A1 | 3/2011 | Ogasawara et al. | |
| 2013/0000957 | A1 | 1/2013 | Ikeda et al. | |
| 2013/0071721 | A1 | 3/2013 | Ogasawara et al. | |
| 2013/0161053 | A1* | 6/2013 | Okamoto | H01M 2/206 |
| | | | | 174/68.1 |
| 2014/0308560 | A1 | 10/2014 | Takishita et al. | |
| 2014/0370342 | A1* | 12/2014 | Nakayama | H01M 10/482 |
| | | | | 429/90 |

FOREIGN PATENT DOCUMENTS

| | | |
|---|---|---|
| JP | 2011-049047 A | 3/2011 |
| JP | 2011-065749 A | 3/2011 |
| JP | 2012-113896 A | 6/2012 |
| JP | 2013-054996 A | 3/2013 |
| JP | 2013-073915 A | 4/2013 |
| JP | 2013-175303 A | 9/2013 |
| WO | 2011/132571 A1 | 10/2011 |
| WO | 2011/142201 A1 | 11/2011 |
| WO | 2012/029995 A1 | 3/2012 |
| WO | 2012/036317 A1 | 3/2012 |
| WO | 2012/108514 A1 | 8/2012 |

OTHER PUBLICATIONS

Definition of "extract" from www.thefreedictionary.com.*
International Search Report for PCT/JP2013/073220 dated Nov. 19, 2013 [PCT/ISA/210].
Written Opinion for PCT/JP2013/073220 dated Nov. 19, 2013 [PCT/ISA/237].
Communication issued Mar. 7, 2016 issued by the European Patent Office in counterpart European Patent Application No. 13832906.5.
Communication dated Jul. 5, 2016, issued by Japanese Intellectual Property Office in counterpart Japanese Application No. 2012-189956.
Office Action dated May 23, 2016, issued by the State Intellectual Property Office of the People's Republic of China in counterpart Chinese Application No. 201380045140.4.

* cited by examiner

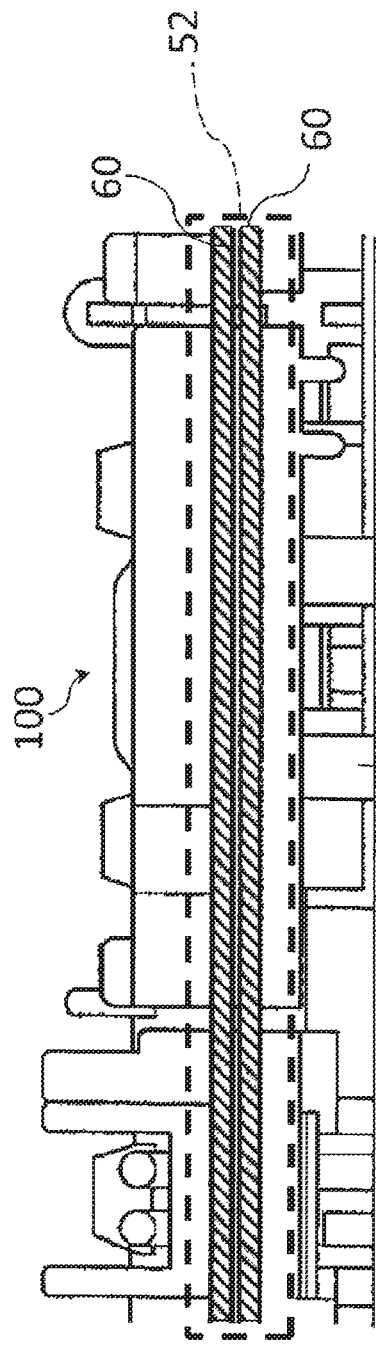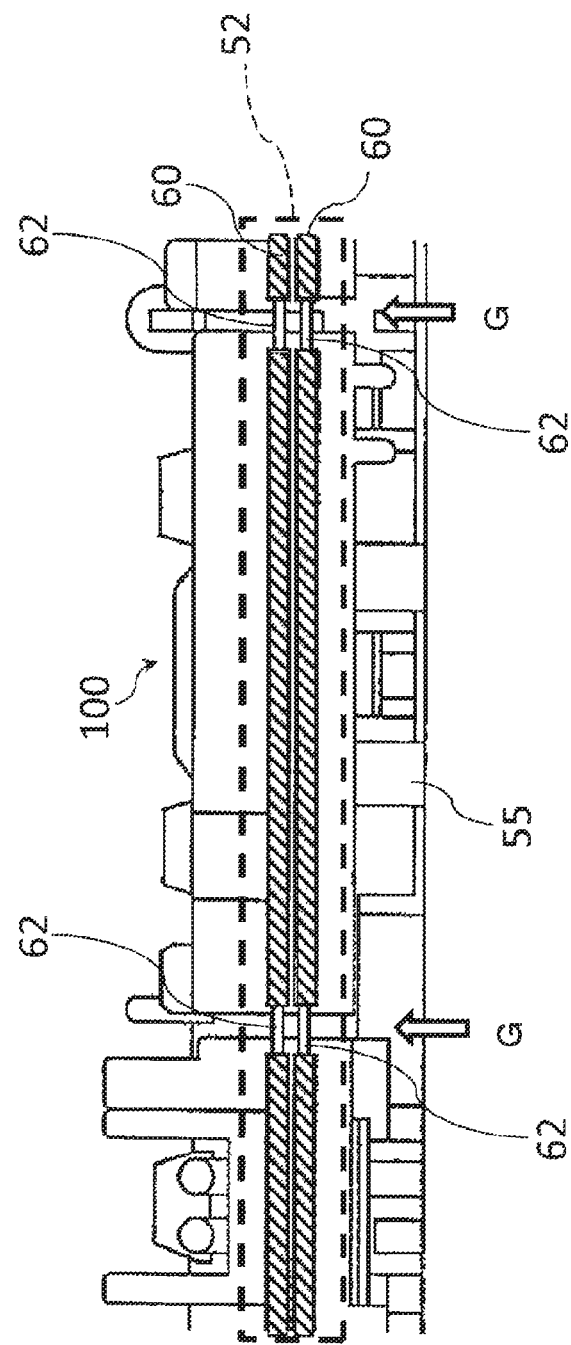
FIG.9(a) PRIOR ART
FIG.9(b) PRIOR ART

100

ELECTRIC WIRE ROUTING STRUCTURE FOR BUS BAR MODULE

TECHNICAL FIELD

The present invention relates to an electric wire routing structure for a bus bar module.

BACKGROUND ART

In an electric wire routing structure for a bus bar module of the conventional art, an electric wire routing space where electric wires are routed is provided in an outer side part and a middle part of the bus bar module. Then, a plurality of detection lines (electric wires) for battery voltage detection or battery temperature detection are routed in the electric wire routing space. Then, all electric wires are collected in one extraction part and then outputted through a connector or the like to the outside of the bus bar module.

Further, a battery aggregate attachment member has been proposed that is attached to a battery aggregate constructed by stacking a plurality of batteries such that the individual electrodes of the plurality of batteries are aligned in line (see Patent Document 1).

The above-mentioned battery aggregate attachment member includes (A) a plurality of terminals electrically connected to the individual electrodes of the plurality of batteries, (B) a plurality of electric wires electrically connected to the individual terminals, (C) a plate including: a terminal accommodation part for accommodating the plurality of terminals; an electric wire accommodation part formed in a gutter shape extending along the direction of stacking of the plurality of batteries and accommodating the plurality of electric wires electrically connected to the individual terminals so as to route the plurality of electric wires to one end side of the battery aggregate; and a plurality of electric wire draw-out parts each communicating with the inside of the terminal accommodation part and with the inside of the electric wire accommodation part so as to lead each electric wire electrically connected to each terminal, from the terminal accommodation part to the electric wire accommodation part, and (D) a cover formed separately from the plate and slid in a direction from the other end side of the battery aggregate to the one end side in the inside of an opening part of the electric wire accommodation part so as to be attached to the electric wire accommodation part and thereby cover the opening part.

PRIOR ART REFERENCES

Patent Document

Patent Document 1: JP-A-2011-65749

DISCLOSURE OF THE INVENTION

Problem to be Solved by the Invention

Meanwhile, in association with an increase in the number of batteries (the number of cells) contained in the battery aggregate (the battery stack), the number of detection lines (electric wires) routed in the inside of the bus bar module is increasing.

In the electric wire routing structure for the bus bar module of the conventional art, all electric wires are collected in one extraction part. Thus, when all electric wires are bundled together, handling of the electric wire bundle in the extraction part becomes difficult. In particular, when all electric wire bundles individually extending in mutually opposite directions are bundled together, handling of the electric wire bundles in the extraction part becomes more difficult.

Further, instead of bundling all electric wires together, the electric wires may be separated into a plurality of electric wire bundles. Nevertheless, from the perspective of wire routing of the detection circuit, the detection lines (the electric wires) in both outer side parts of the bus bar module need be combined together. Thus, the volume itself of the detection lines in the extraction part becomes large.

Further, in the electric wire routing structure for the bus bar module of the conventional art, a plurality of detection lines are routed in the middle part of the bus bar module. Thus, when the insulators of the detection lines are eroded by high temperature gas G discharged through a smoke exhaust valve in case of abnormality in the battery stack, a possibility arises that nearby detection lines suffer a short circuit so as to affect the detection performance.

For example, FIG. 7 is a plan view showing an electric wire routing structure for a bus bar module of the conventional art. As shown in FIG. 7, a bus bar module 100 includes a plurality of bus bar module accommodation parts 50, an outer side electric wire accommodation part (the outer side part) 51, a middle electric wire accommodation part (the middle part) 52, and an extraction part 53.

The bus bar module 100 is attached to a battery stack 55 so as to constitute an electric power unit. The battery stack 55 is constructed by stacking a plurality of batteries. Then, each battery has a positive electrode and a negative electrode. At the time that the plurality of batteries are stacked, the plurality of batteries are stacked on one another alternately in opposite directions such that the positive electrode and the negative electrode of two adjacent batteries become adjacent to each other.

The bus bar module accommodation part 50 accommodates: a bus bar 56 for electrically connecting the positive electrode and the negative electrode of two adjacent batteries; a terminal 57 conductive to the electrode of the battery; and a nut 58 for tightening the bus bar 56 and the terminal 57 to the electrode of the battery. The terminal 57 is connected to a detection line (an electric wire) 59 for detecting the battery voltage. A plurality of detection lines 59 connected respectively to the plurality of terminals 57 are routed to the outer side electric wire accommodation part 51 and are collected in the extraction part 53 through two rows of the outer side electric wire accommodation parts 51-1 and 51-2. As such, when all detection lines 59 are collected and bundled together in one extraction part 53, handling of the detection line bundles in the extraction part 53 becomes difficult and the volume itself of the detection lines 59 in the extraction part 53 becomes large. In particular, when all detection line bundles individually extending in mutually opposite directions through the two rows of the outer side electric wire accommodation parts 51-1 and 51-2 are bundled, the detection line bundles intersect with each other and are collected together in the extraction part 53. Thus, handling of the electric wire bundles in the extraction part 53 becomes more difficult.

Further, detection lines (detection lines for battery voltage detection or battery temperature detection) are collected together with the plurality of detection lines 59 in the extraction part 53 through the middle electric wire accommodation part 52. FIG. 8 is an enlarged view of X of FIG. 7. As shown in FIG. 8, a plurality of detection lines 60 are routed to the middle electric wire accommodation part 52 and then collected in the extraction part 53. FIGS. 9(a) and 9(b) are sectional views taken along line A-A in FIG. 8 and viewed from the arrow direction. As shown in FIG. 9(a), the plurality of detection lines 60 are routed to the middle electric wire accommodation part 52. Then, as shown in FIG. 9(b), high temperature gas G discharged through the smoke exhaust valve in case of abnormality in the battery stack 55 causes a possibility that the insulators of the detection lines 60 are eroded so that the lead wires 62 become uncovered (exposed). When the plurality of lead wires 62 routed to the middle electric wire accommodation part 52 become uncovered, the detection lines 60 suffer a short circuit so as to affect the detection performance. FIG. 10 is a diagram of a part of the bus bar module 100 shown in FIG. 9(b), which is viewed from above. As shown in FIG. 10, when the lead wires 62 having become uncovered approach to each other, a possibility arises that the detection lines 60 suffer a short circuit so as to affect the detection performance.

The present invention has been devised in order to resolve the above-mentioned problems in the conventional art. An object thereof is to provide an electric wire routing structure for a bus bar module in which handling of electric wire bundles in an extraction part is made easy and in which even when insulators of detection lines are eroded by high temperature gas G discharged from a smoke exhaust valve in case of abnormality in a battery stack, a short circuit in the detection lines can be prevented.

Means for Solving the Problem

The above-mentioned object of the present invention is achieved by the following configurations.

(1) An electric wire routing structure for a bus bar module including: a first-group accommodation part in which accommodation parts each of which accommodates at least one of a bus bar, a terminal, and an electric wire connected to the terminal are arranged; a second-group accommodation part in which accommodation parts each of which accommodates at least one of a bus bar, a terminal, and an electric wire connected to the terminal are arranged; a linkage part located between the first-group accommodation part and the second-group accommodation part and linking the first-group accommodation part and the second-group accommodation part to each other; and an electric wire routing part provided in the linkage part and accommodating the electric wires.

According to the electric wire routing structure for the bus bar module having the above-mentioned configuration (1), electric wires are routed to the electric wire routing part provided in the linkage part so that the electric wires can be routed from the first-group accommodation part side to the second-group accommodation part side (or from the second-group accommodation part side to the first-group accommodation part side). Thus, when the direction of routing of the electric wires is selected, handling of the electric wire bundles can be made easy.

(2) The electric wire routing structure for the bus bar module having the above-mentioned configuration (1), including: a first accommodation part constituting the first-group accommodation part; and a second accommodation part constituting the second-group accommodation part and arranged opposite to at least apart of the first accommodation part, wherein the electric wire routing part is provided in the linkage part linking the first accommodation part and the second accommodation part to each other.

According to the electric wire routing structure for the bus bar module having the above-mentioned configuration (2), the electric wires can be routed from one accommodation part side to the other accommodation part side among the mutually opposite accommodation parts. Then, when this work is performed on each of the mutually opposite accommodation parts, the direction of routing of the electric wires can be selected for each of the mutually opposite accommodation parts so that handling of the electric wire bundles can be made easy.

(3) The electric wire routing structure for the bus bar module having the above-mentioned configuration (2), including: a first electric wire accommodation part located on an outer side of the first-group accommodation part and accommodating a plurality of the electric wires; a first extraction part located in an end part of the first electric wire accommodation part and having a structure for extracting the plurality of the electric wires; a second electric wire accommodation part located on an outer side of the second-group accommodation part and accommodating a plurality of the electric wires; and a second extraction part located in an end part of the second electric wire accommodation part and having a structure for extracting the plurality of the electric wires, wherein the electric wire routing part leads the electric wires from the second-group accommodation part to the first electric wire accommodation part, or the electric wire routing part leads the electric wires from the first-group the accommodation part to the second electric wire accommodation part, the first extraction part has a structure for extracting the electric wires led from the second-group accommodation part to the first electric wire accommodation part, and the second extraction part has a structure for extracting the electric wires led from the first-group accommodation part to the second electric wire accommodation part.

According to the electric wire routing structure for the bus bar module having the above-mentioned configuration (3), all electric wires can be routed/collected to any of the first electric wire accommodation part and the second electric wire accommodation part. This avoids the necessity of collecting all electric wires in the extraction parts and hence makes easy the handling of electric wire bundles. Further, even when the electric wires are routed/collected individually to the first electric wire accommodation part and the second electric wire accommodation part, the electric wires can be exerted from each of the first extraction part and the second extraction part to the outside, and all electric wires can be collected in the outside. This avoids the necessity of collecting all electric wires in the extraction parts and hence makes easy the handling of electric wire bundles.

(4) The electric wire routing structure for the bus bar module having the above-mentioned configuration (3), wherein the electric wire routing part leads the one electric wire from the second accommodation part to the first electric wire accommodation part, or the electric wire routing part leads the one electric wire from the first accommodation part to the second electric wire accommodation part.

According to the electric wire routing structure for the bus bar module having the above-mentioned configuration (4), the number of electric wires accommodated in the electric wire routing part is one. Thus, even when the insulator of the electric wire (the detection line) is eroded by high temperature gas discharged through the smoke exhaust valve in case of abnormality in the battery stack and thereby the lead wire is exposed in the inside of the electric wire routing part, a short circuit in the electric wire (the detection line) can be prevented.

BRIEF DESCRIPTION OF THE DRAWINGS

FIG. 4(a) shows a situation that one electric wire is accommodated in an electric wire routing part; and FIG. 4(b) shows a situation that the insulator of an electric wire has been eroded so that the lead wire has become uncovered.

FIGS. 9(a) and 9(b) are sectional views taken along line A-A in FIG. 8 and viewed from the arrow direction; FIG. 9(a) shows a situation that a plurality of electric wires are routed in a middle electric wire accommodation part; and FIG. 9(b) shows a situation that the insulators of detection lines have been eroded so that the lead wires have become uncovered.

BEST MODE FOR CARRYING OUT THE INVENTION

An electric wire routing structure for a bus bar module according to an embodiment of the present invention is described below with reference to the drawings.

Figure 1:
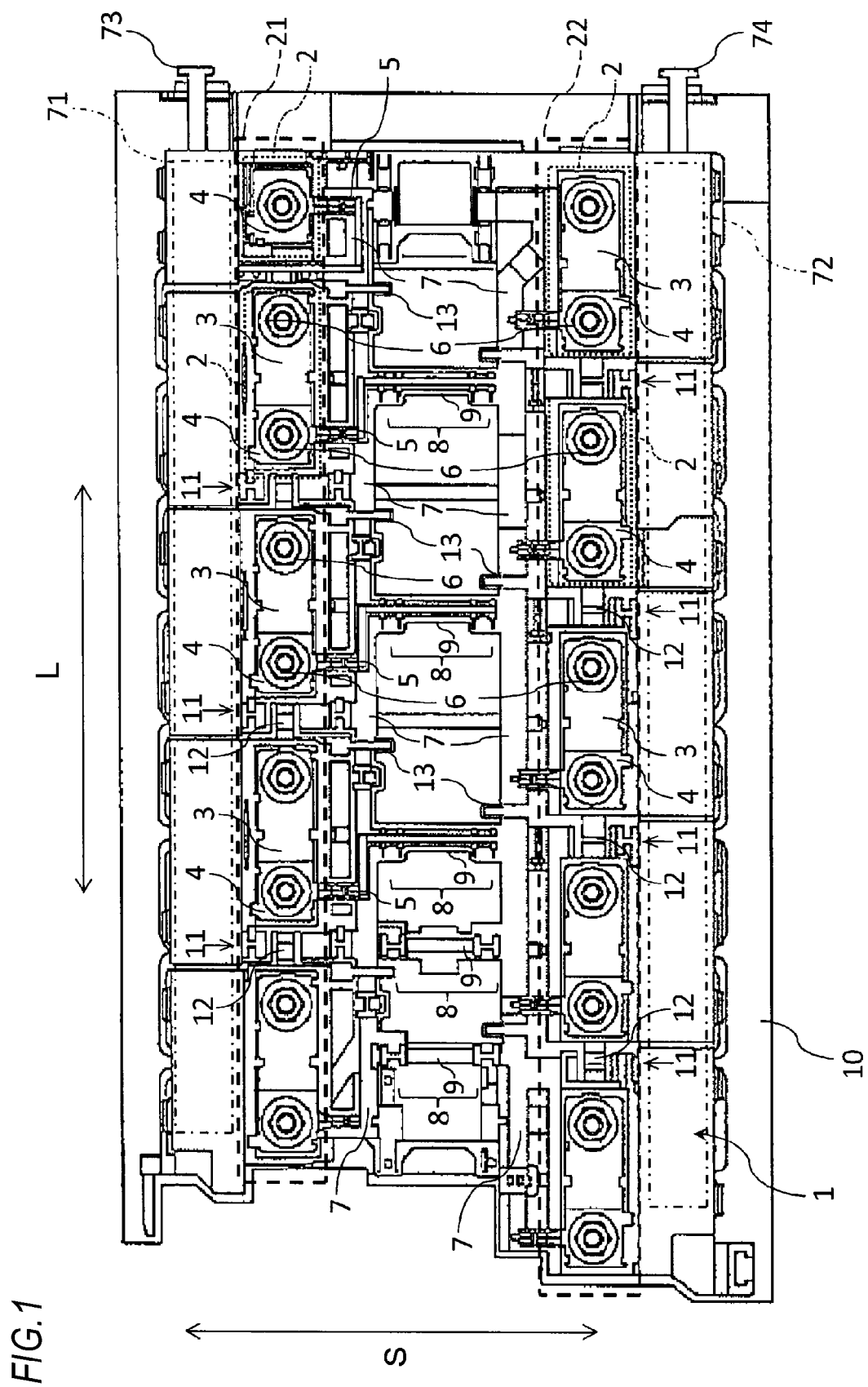
FIG. 1 is a plan view showing an example of a bus bar module including an electric wire routing structure for a bus bar module according to an embodiment of the present invention.

FIG. 1 is a plan view showing an example of a bus bar module including an electric wire routing structure for a bus bar module according to an embodiment of the present invention.

A bus bar module 1 is attached to a battery (a battery stack) 10 so as to constitute an electric power unit. The battery stack 10 is constructed by stacking a plurality of batteries. Each battery has a positive electrode and a negative electrode. At the time that the plurality of batteries are stacked, the plurality of batteries are stacked on each other alternately in opposite directions such that the positive electrode and the negative electrode of two adjacent batteries become adjacent to each other.

The electric power unit supplies electric power to each component of an automobile. Further, the electric power unit is mounted on an electric vehicle or a hybrid vehicle and supplies electric power to the electric motor or, alternatively, is charged by the electric motor.

In the bus bar module 1 including the electric wire routing structure for the bus bar module according to the present embodiment, a plurality of accommodation parts 2 are provided on a plate formed from electrically insulating synthetic resin. The accommodation part 2 accommodates at least one of a bus bar 3, a terminal 4, and an electric wire 5 connected to the terminal 3. The plurality of accommodation parts 2 arranged in the longitudinal direction (in the arrow L direction in the figure) of the accommodation part 2 having a rectangular shape. Then, the bus bar module 1 includes: a first-group accommodation part 21 in which the accommodation parts 2 are arranged; and a second-group accommodation part 22 in which the accommodation parts 2 are arranged. That is, the plurality of accommodation parts 2 arranged in the longitudinal direction are arranged in two rows with an interval therebetween.

The bus bar 3 is a plate-shaped metal piece formed by press work or the like and includes two holes into which electrodes having protruding shapes are inserted. The positive electrode of one of adjacent batteries is inserted into one of the two holes and the negative electrode of the other one of the adjacent batteries is inserted into the other one of the two holes. By virtue of this, the plurality of batteries are electrically connected in series. The bus bar 3 in which the electrodes have been inserted into the holes is fixed to the inside of the accommodation part 2 when nuts 6 are tightened to the electrodes.

The terminal 4 is a plate-shaped metal piece formed by press work or the like and includes one hole into which an electrode having a protruding shape is inserted. In a manner that the terminal 4 overlaps with the above of the bus bar 3, an electrode is inserted from the above of the hole of the bus bar 3 into the hole of the terminal 4. The terminal 4 is connected to a detection line (an electric wire) 5 for detecting the battery voltage. The terminal 4 in which the electrode has been inserted into the hole is fixed to the inside of the accommodation part 2 together with the bus bar 3 when a nut 6 is tightened to the electrode.

In the electric wires 5, one end is connected to the terminal 4 and the other end is connected to a connector (not shown). The electric wire 5 is a covered electric wire of common knowledge in which the conductor is exposed in a portion to be electrically connected and is covered with an insulator in the other portion. Further, as described above, a possibility is present that the insulator is eroded by high temperature gas G so that the conductor become exposed. The electric wire 5 is routed from the terminal 4 to the inside of the bus bar module 1 and then connected to a connector so as to be connected to a voltage detector (not shown).

Between the first-group accommodation part 21 and the second-group accommodation part 22, an inner side electric wire accommodation part 7 is provided that is adjacent respectively to the inner side parts of the first-group and second-group accommodation parts 21 and 22. The inner side electric wire accommodation part 7 extends in the longitudinal direction (in the arrow L direction in the figure) of the accommodation part 2 approximately in parallel to the first-group and second-group accommodation parts 21 and 22.

Further, outer side electric wire accommodation parts (first and second electric wire accommodation parts) 71 and 72 are adjacent to and provided in the outer side parts of the first-group and second-group accommodation parts 21 and 22. The outer side electric wire accommodation parts (the first and second electric wire accommodation parts) 71 and 72 extend in the longitudinal direction (in the arrow L direction in the figure) of the accommodation part 2 approximately in parallel to the first-group and second-group accommodation parts 21 and 22. The first electric wire accommodation part (the outer side electric wire accommodation part) 71 is located on the outer side of the first-group accommodation part 21 and accommodates a plurality of the electric wires 5. The second electric wire accommodation part (the outer side electric wire accommodation part) 72 is located on the outer side of the second-group accommodation part 22 and accommodates a plurality of the electric wires 5.

Between the first-group accommodation part 21 and the second-group accommodation part 22, a linkage part 8 is located that links the first-group accommodation part 21 and the second-group accommodation part 22 to each other. The linkage part 8 is provided with an electric wire routing part 9 for accommodating the electric wire 5 and extends approximately in perpendicular to the first-group and second-group accommodation parts 21 and 22 in the transverse direction (in the arrow S direction in the figure) of the accommodation part 2.

Further, in each of the first-group accommodation part 21 and the second-group accommodation part 22, an electric wire routing part 11 for accommodating the electric wire 5 is provided between the accommodation parts 2. The electric wire routing part 11 extends approximately in perpendicular to the first-group and second-group accommodation parts 21 and 22 in the transverse direction (in the arrow S direction in the figure) of the accommodation part 2. The electric wire routing parts 11 connect the inner side electric wire accommodation part 7 and the outer side electric wire accommodation parts (the first and second electric wire accommodation parts) 71 and 72 to each other, and lead the electric wires 5 from the terminals 4, from the inner side electric wire accommodation part 7 to the outer side electric wire accommodation parts (the first and second electric wire accommodation parts) 71 and 72.

A first extraction part 73 is located in an end part of the first electric wire accommodation part (the outer side electric wire accommodation part) 71 and has a structure for extracting the plurality of electric wires 5. A second extraction part 74 is located in an end part of the second electric wire accommodation part (the outer side electric wire accommodation part) 72 and has a structure for extracting the plurality of electric wires 5. The plurality of electric wires 5 having been led to the outer side electric wire accommodation parts (the first and second electric wire accommodation parts) 71 and 72 are collected respectively in the first extraction part 73 and the second extraction part 74, and then connected through a connector or the like to the outside of the bus bar module 1.

In each of the first-group accommodation part 21 and the second-group accommodation part 22, the adjacent accommodation parts 2 are linked together by a hinge 12. The hinge 12 has an elastic force and hence can adjust the interval of the adjacent accommodation parts 2 by means of contraction, expansion, or warpage. Thus, the bus bar module 1 can easily be attached to the battery stack 10 having a large accumulated tolerance. Further, similarly to the accommodation parts 2, the inner side electric wire accommodation part 7 and the outer side electric wire accommodation parts (the first and second electric wire accommodation parts) 71 and 72 are also separated into individual portions or, alternatively, such separated portions are linked by an elastic part (such as a hinge). For example, the inner side electric wire accommodation parts 7 are linked by a hinge 13. The hinge 13 has an elastic force and hence can adjust the interval of the adjacent inner side electric wire accommodation parts 7 by means of contraction, expansion, or warpage. Thus, the bus bar module 1 can easily be attached to the battery stack 10 having a large accumulated tolerance.

Figure 2:
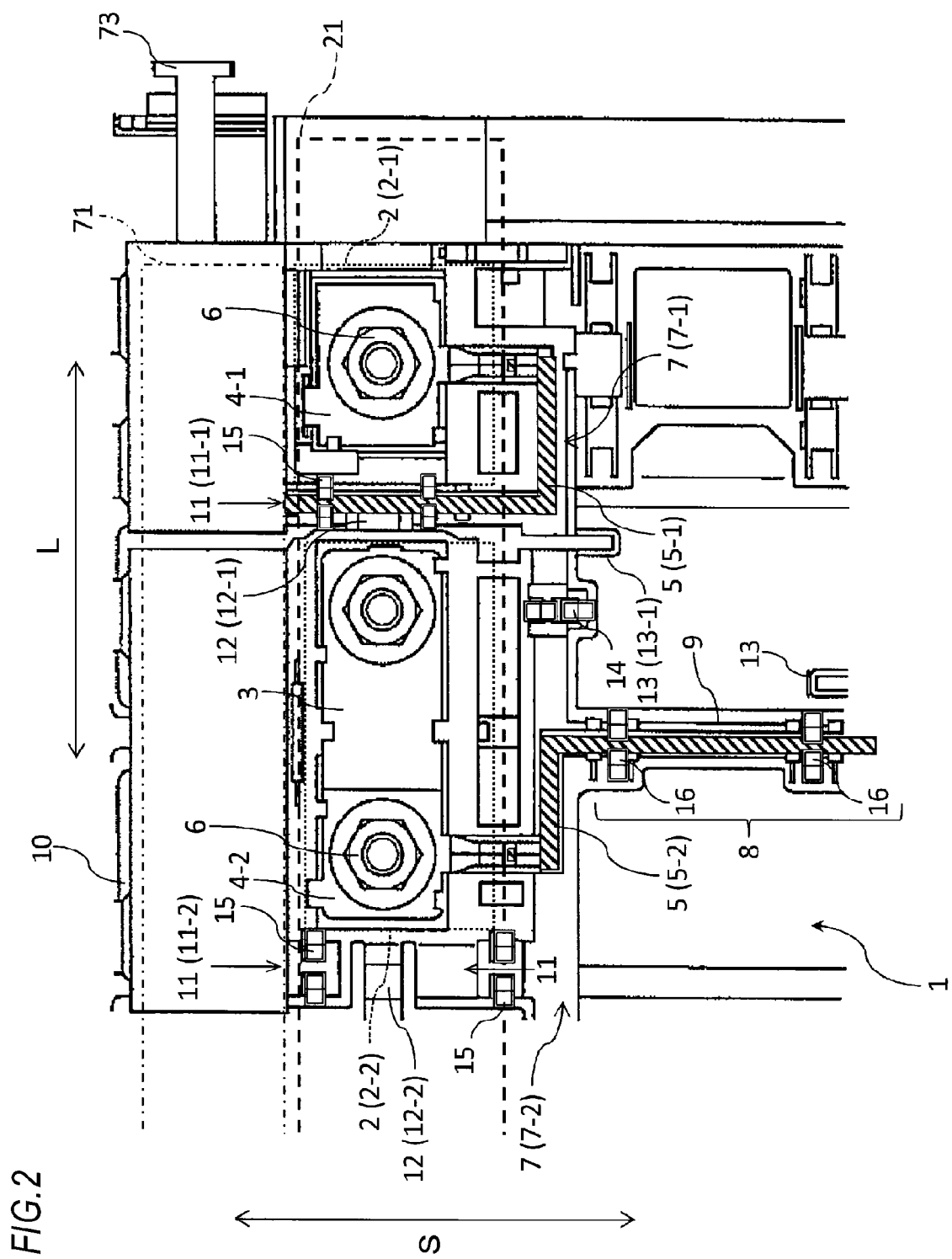
FIG. 2 is an enlarged view of a part of FIG. 1.

Next, wire routing of the electric wire 5 is described below. FIG. 2 is an enlarged view of a part of FIG. 1. As shown in FIG. 2, in the first-group accommodation part 21, accommodation parts 2-1 and 2-2 are arranged in the longitudinal direction (in the arrow L direction in the figure) of the accommodation part 2. The accommodation part 2-1 and the accommodation part 2-2 are linked together by a hinge 12-1. On the inner side of the accommodation part 2-1, an inner side electric wire accommodation part 7-1 is arranged with a predetermined space therebetween. On the inner side of the accommodation part 2-2, an inner side electric wire accommodation part 7-2 is arranged with a predetermined space therebetween. The inner side electric wire accommodation part 7-1 and the inner side electric wire accommodation part 7-2 are linked together by a hinge 13-1. The inner side electric wire accommodation parts 7-1 and 7-2 accommodate the electric wires 5 in the longitudinal direction (in the arrow L direction in the figure) of the accommodation part 2. The inner side electric wire accommodation part 7 includes mutually opposite two protruding parts (or claw parts) 14 and has a structure that the electric wire 5 is locked by the two protruding parts 14 so that the electric wire 5 is retained in the inside of the inner side electric wire accommodation part 7.

Between the accommodation part 2-1 and the accommodation part 2-2, an electric wire routing part 11-1 is provided in addition to the hinge 12. The electric wire routing part 11-1 accommodates the electric wire 5 in the transverse direction (in the arrow S direction in the figure) of the accommodation part 2. The electric wire routing part 11 includes mutually opposite two protruding parts (or claw parts) 15 on both sides of the hinge 12-1 and has a structure that the electric wire 5 is locked by the two protruding parts 15 so that the electric wire 5 is retained in the inside of the electric wire routing part 11.

The linkage part 8 extends approximately in perpendicular from the inner side electric wire accommodation part 7-1 to the inner side electric wire accommodation part 7 of the second-group accommodation part 22. As a result, the linkage part 8 links the first-group accommodation part 21 and the second-group accommodation part 22 to each other. As shown in FIG. 1, the linkage part 8 is arranged approximately on the same straight line (in the transverse direction) relative to the electric wire routing part 11 between the accommodation parts 2 constituting the second-group accommodation part 22. As a result, the electric wires 5 routed from the first-group accommodation part 21 are routed through the electric wire routing part 9 provided in the linkage part 8 linearly to the electric wire routing part 11 of the second-group accommodation part 22. By virtue of this, the electric wires 5 are led to the second electric wire accommodation part (the outer side electric wire accommodation part) 72 without useless detour and bending.

The electric wire routing part 9 provided in the linkage part 8 includes mutually opposite two protruding parts (or claw parts) 16 and has a structure that the electric wire 5 is locked by the two protruding parts 16 so that the electric wire 5 is retained in the inside of the electric wire routing part 9.

An electric wire 5-1 connected to a terminal 4-1 of the accommodation part 2-1 is routed from the inner side electric wire accommodation part 7-1 to the electric wire routing part 11-1, and led to the first electric wire accommodation part (the outer side electric wire accommodation part) 71. An electric wire 5-2 connected to a terminal 4-2 of the accommodation part 2-2 is routed from the inner side electric wire accommodation part 7-2 through the electric wire routing part 9 to an electric wire routing part 11-2, and led to the second electric wire accommodation part (the outer side electric wire accommodation part) 72.

As such, in accordance with selection, the electric wire routing part 9 provided in the linkage part 8 leads the electric wires 5 from the first-group accommodation part 21 to the second-group accommodation part 22, and leads the electric wires 5 to the second electric wire accommodation part (the outer side electric wire accommodation part) 72. Alternatively, in accordance with selection, the electric wire routing part 9 provided in the linkage part 8 leads the electric wires 5 from the second-group accommodation part 22 to the first-group accommodation part 21, and leads the electric wires 5 to the first electric wire accommodation part (the outer side electric wire accommodation part) 71. Further, the first extraction part 73 has a structure for extracting the electric wires 5 led from the second-group accommodation part 22 to the first electric wire accommodation part (the outer side electric wire accommodation part) 71. The second extraction part 74 has a structure for extracting the electric wires 5 led from the first-group accommodation part 21 to the second electric wire accommodation part (the outer side electric wire accommodation part) 72.

As a result, all electric wires 5 can be routed/collected to any one of the first electric wire accommodation part (the outer side electric wire accommodation part) 71 and the second electric wire accommodation part (the outer side electric wire accommodation part) 72. This avoids the necessity of collecting all electric wires 5 in the extraction parts and hence makes easy the handling of electric wire bundles. Further, as shown in FIG. 2, since the electric wire 5-1 is routed/collected to the first electric wire accommodation part (the outer side electric wire accommodation part) 71 and the electric wire 5-2 is routed/collected to the second electric wire accommodation part (the outer side electric wire accommodation part) 72, even in a case that the electric wires 5 are routed/collected individually to the first electric wire accommodation part (the outer side electric wire accommodation part) 71 and the second electric wire accommodation part (the outer side electric wire accommodation part) 72, the electric wires 5 can be extracted from each of the first extraction part 73 and the second extraction part 74 to the outside, and all electric wires 5 can be collected in the outside. This avoids the necessity of collecting all electric wires 5 in the extraction parts and hence makes easy the handling of electric wire bundles.

Figure 3:
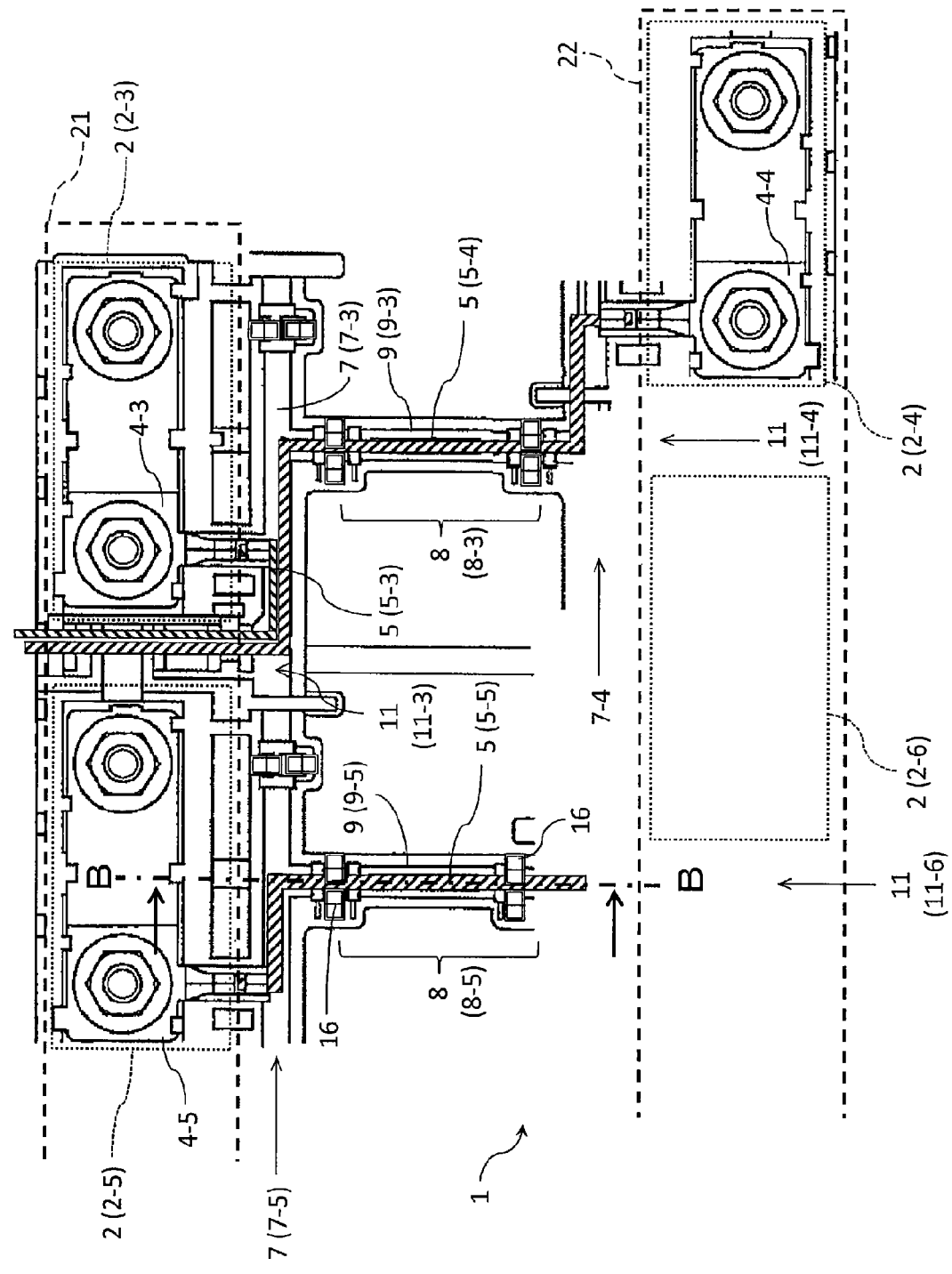
FIG. 3 is an enlarged view of a part of FIG. 1, which shows another example of wire routing.

FIG. 3 is an enlarged view of a part of FIG. 1, which shows another example of wire routing. As shown in FIG. 3, the electric wire routing structure for the bus bar module according to the present embodiment includes: an accommodation part (a first accommodation part) 2-3 constituting the first-group accommodation part 21; and an accommodation part (a second accommodation part) 2-4 constituting the second-group accommodation part 22 and arranged opposite to at least a part of the first accommodation part 2-3. An electric wire routing part 9-3 is provided in a linkage part 8-3 for linking the accommodation part (the first accommodation part) 2-3 and the accommodation part (the second accommodation part) 2-4 to each other.

Similarly, the electric wire routing structure for the bus bar module according to the present embodiment includes: an accommodation part (a first accommodation part) 2-5 constituting the first-group accommodation part 21; and an accommodation part (a second accommodation part) 2-6 constituting the second-group accommodation part 22 and arranged opposite to at least a part of the first accommodation part 2-5. An electric wire routing part 9-5 is provided in a linkage part 8-5 for linking the accommodation part (the first accommodation part) 2-5 and the accommodation part (the second accommodation part) 2-6 to each other.

As shown in FIG. 1, the bus bar 3 electrically connects a positive electrode and a negative electrode of two adjacent batteries, and the bus bar 3 are arranged in the longitudinal direction (in the arrow L direction in the figure) of each of the first-group and second-group accommodation parts 21 and 22. The bus bar 3 of the first-group accommodation part 21 and the bus bar 3 of the second-group accommodation part 22 are arranged opposite to each other with mutual deviation by one electrode. By virtue of this, the plurality of stacked batteries can be electrically connected in series. For the purpose of arranging the bus bars 3 as described here, the accommodation parts 2 are arranged in the bus bar module 1. Accordingly, the accommodation part (the first accommodation part) 2-3 and the accommodation part (the second accommodation part) 2-4 in FIG. 3 are arranged opposite to each other with mutual deviation by one electrode. Similarly, the accommodation part (the first accommodation part) 2-5 and the accommodation part (the second accommodation part) 2-6 are arranged opposite to each other with mutual deviation by one electrode.

The linkage parts 8-3 and 8-5 shown in FIG. 3 extend in the transverse direction (in the arrow S direction in the figure) from the center parts in the longitudinal direction of the accommodation parts (the first accommodation parts) 2-3 and 2-5. In other words, the linkage parts 8-3 and 8-5 extend in the transverse direction (in the arrow S direction in the figure) from electric wire routing parts 11-4 and 11-6 of the accommodation parts (the second accommodation parts) 2-4 and 2-6.

An electric wire 5-3 connected to a terminal 4-3 of the accommodation part 2-3 is routed from an inner side electric wire accommodation part 7-3 to an electric wire routing part 11-3, and led to the first electric wire accommodation part (the outer side electric wire accommodation part) 71. An electric wire 5-4 connected to a terminal 4-4 of the accommodation part 2-4 is routed from an inner side electric wire accommodation part 7-4 through the electric wire routing part 9 and the inner side electric wire accommodation part 7-3 to the electric wire routing part 11-3, and led to the first electric wire accommodation part (the outer side electric wire accommodation part) 71. An electric wire 5-5 connected to a terminal 4-5 of the accommodation part 2-5 is routed from an inner side electric wire accommodation part 7-5 through the electric wire routing part 9-5 to an electric wire routing part 11-6, and led to the second electric wire accommodation part (the outer side electric wire accommodation part) 72.

As such, in accordance with selection, the electric wire routing part 9-3 provided in the linkage part 8-3 can lead the electric wire 5-4 from the accommodation part (the second accommodation part) 2-4 to the first electric wire accommodation part (the outer side electric wire accommodation part) 71. Alternatively, in accordance with selection, the electric wire routing part 9-5 provided in the linkage part 8-5 can lead the electric wire 5-5 from the accommodation part (the first accommodation part) 2-5 to the second electric wire accommodation part (the outer side electric wire accommodation part) 72.

Further, the electric wire routing part 9-3 may lead one electric wire 5-4 from the accommodation part (the second accommodation part) 2-4 to the first electric wire accommodation part (the outer side electric wire accommodation part) 71. Alternatively, the electric wire routing part 9-5 may lead one electric wire 5-5 from the accommodation part (the first accommodation part) 2-5 to the second electric wire accommodation part (the outer side electric wire accommodation part) 72.

Figure 4:
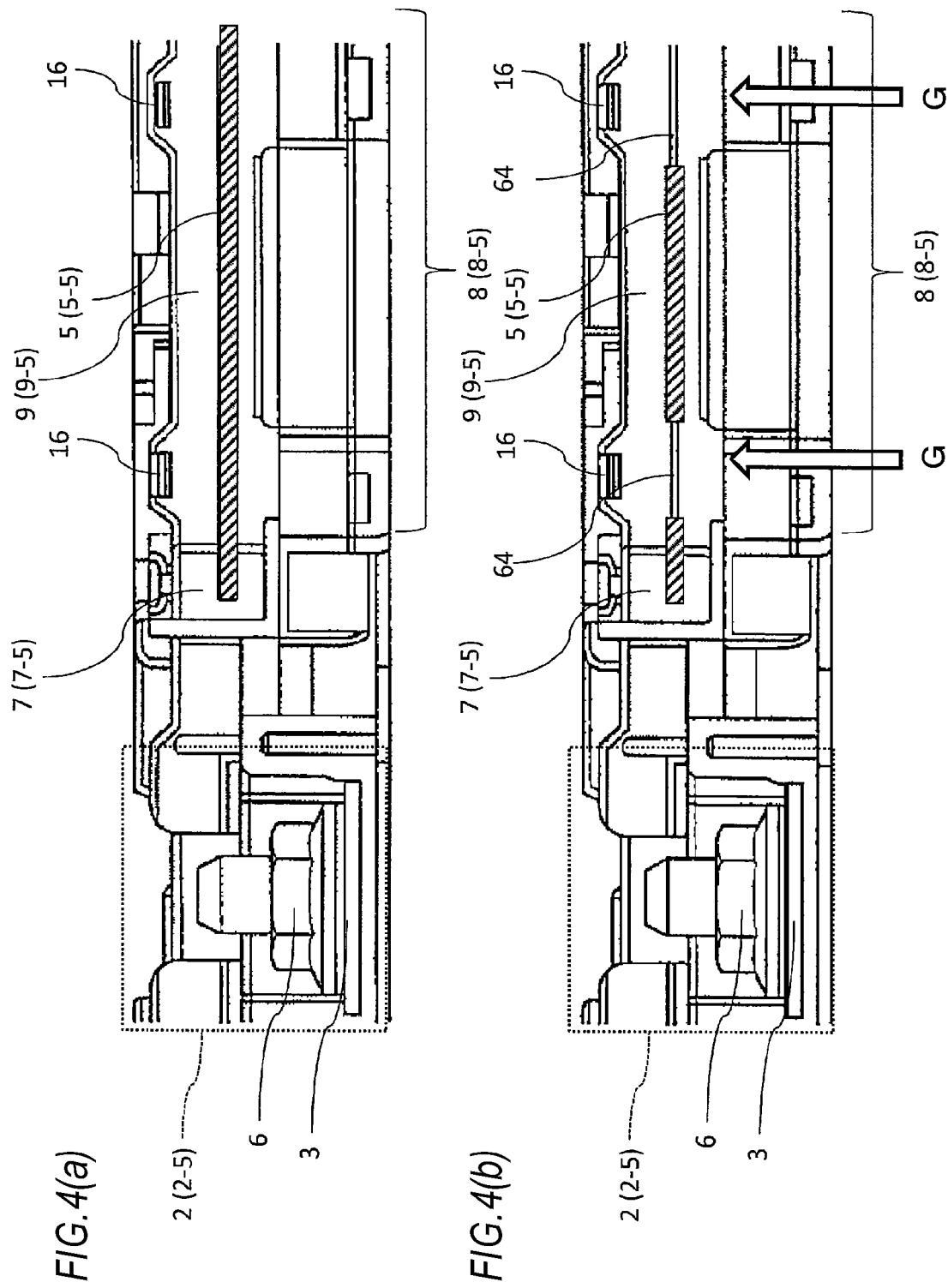
FIGS. 4(a) and 4(b) are sectional views taken along line B-B in FIG. 3 and viewed from the arrow direction.

FIGS. 4(*a*) and 4(*b*) are sectional views taken along line B-B in FIG. 3 and viewed from the arrow direction. As shown in FIG. 4(*a*), the electric wire routing part 9-5 accommodates one electric wire 5-5 and holds the electric wire 5-5 in the inside of the electric wire routing part 9-5 by using the protruding parts 16. In this case, as shown in FIG. 4(*b*), high temperature gas G discharged through the smoke exhaust valve in case of abnormality in the battery stack 10 causes a possibility that the insulator of the electric wire (the detection line) 5-5 is eroded so that a lead wire 64 become uncovered (exposed). However, even when the lead wire 64 routed to the electric wire routing part 9-5 becomes uncovered, one electric wire 5-5 alone is accommodated in the electric wire routing part 9-5. Thus, the electric wire (detection line) 5-5 does not suffer a short circuit and hence does not affect the detection performance.

Figure 5:
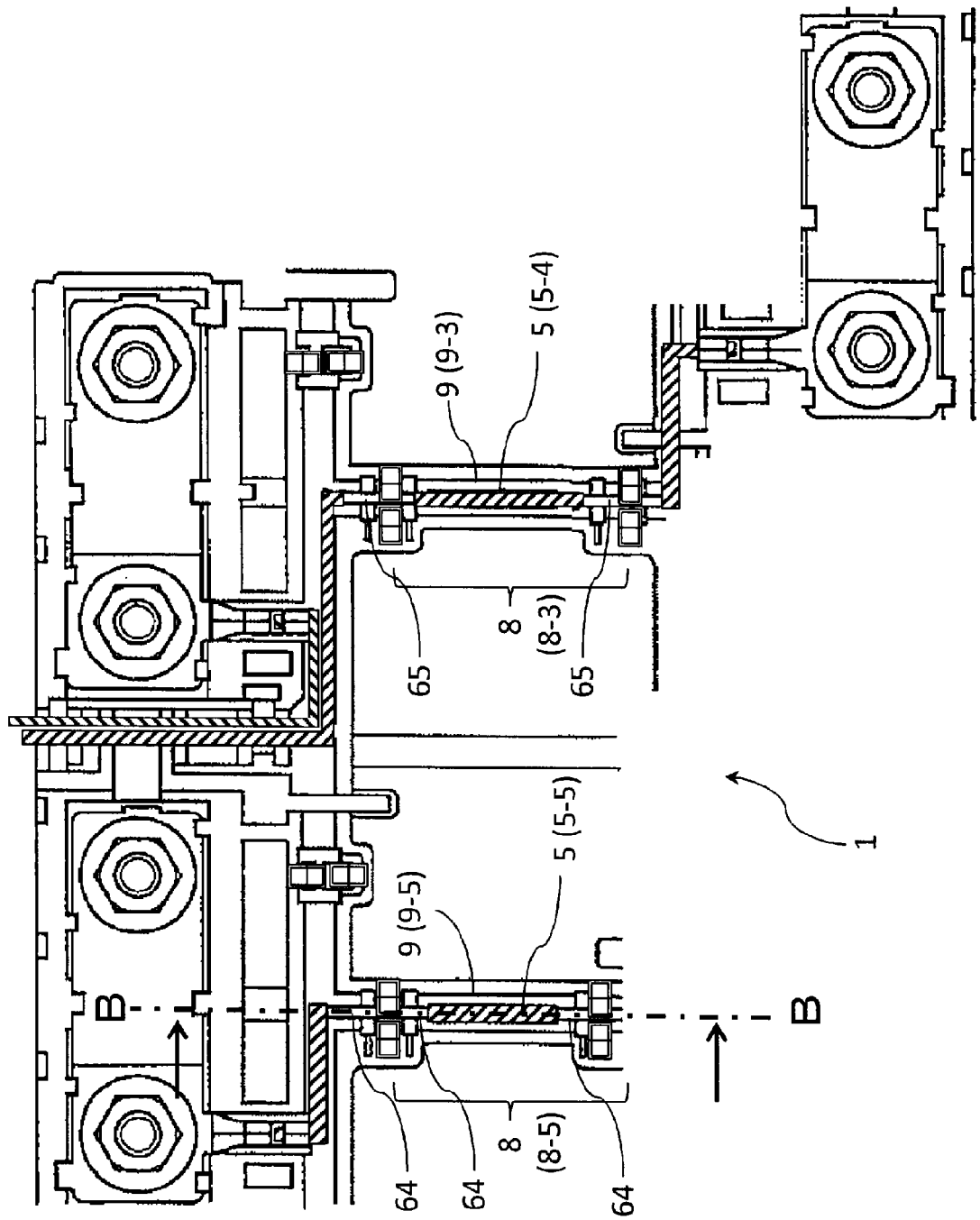
FIG. 5 is a top view of FIG. 4(b).

FIG. 5 is a diagram in which FIG. 4(b) is viewed from above. As shown in FIG. 5, even when the insulator of the electric wire (the detection line) 5-5 is eroded so that the lead wire 64 is exposed in the inside of the electric wire routing part 9-5, a short circuit in the electric wire (lead wire) 5-5 can be prevented. Similarly, one electric wire 5-4 alone is accommodated in the electric wire routing part 9-3. Thus, even when the insulator of the electric wire (the detection line) 5-4 is eroded by high temperature gas G discharged through the smoke exhaust valve in case of abnormality in the battery stack 10 so that a lead wire 65 is exposed in the inside of the electric wire routing part 9-3, a short circuit in the electric wire (the detection line) 5-4 can be prevented.

Embodiments according to the present invention have been described above. However, the present invention is not limited to these. That is, changes and modifications may be made within the scope of the claims.

Figure 6:
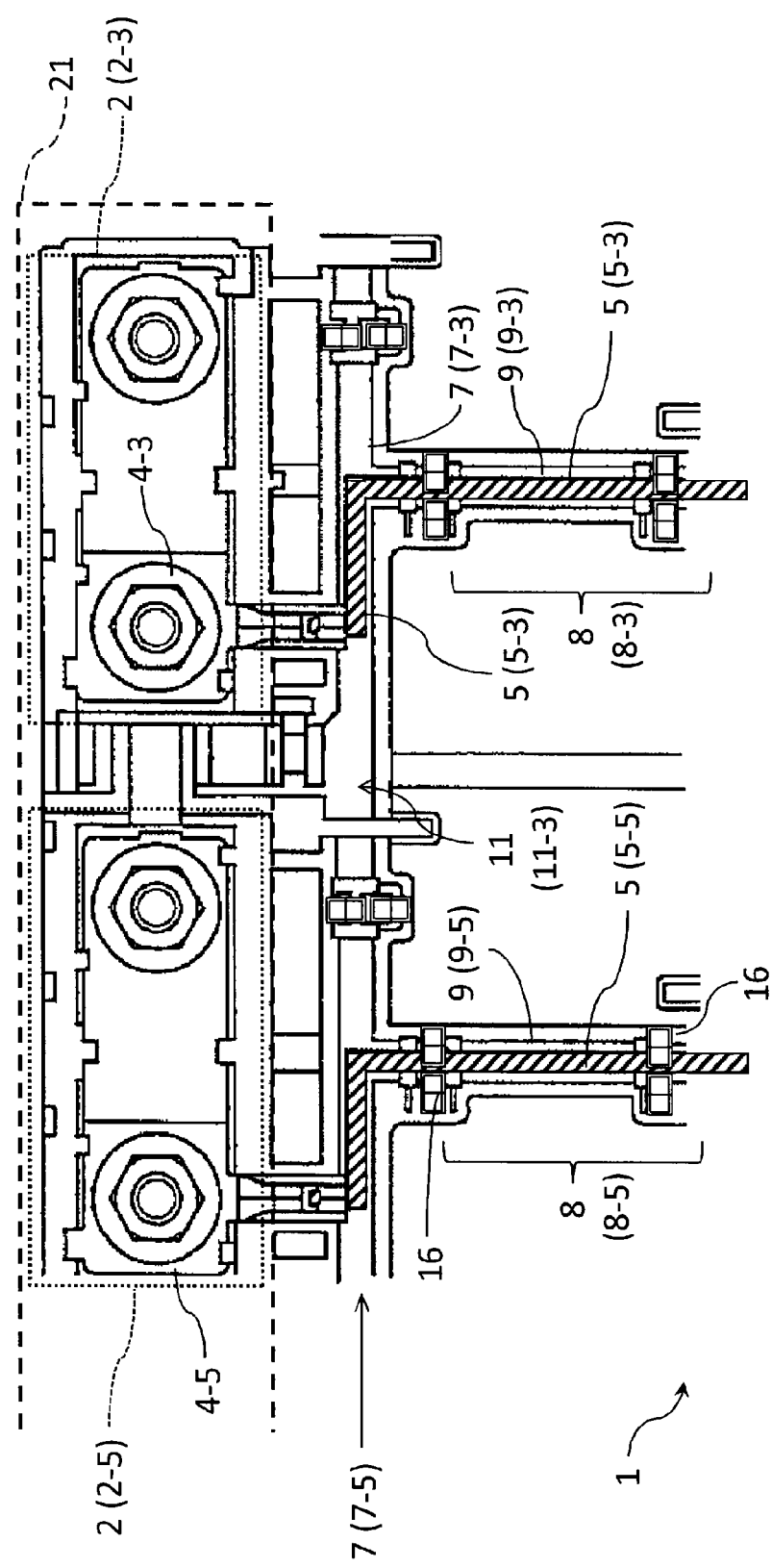
FIG. 6 is a diagram showing another example of wire routing of FIG. 3.
Figure 7:
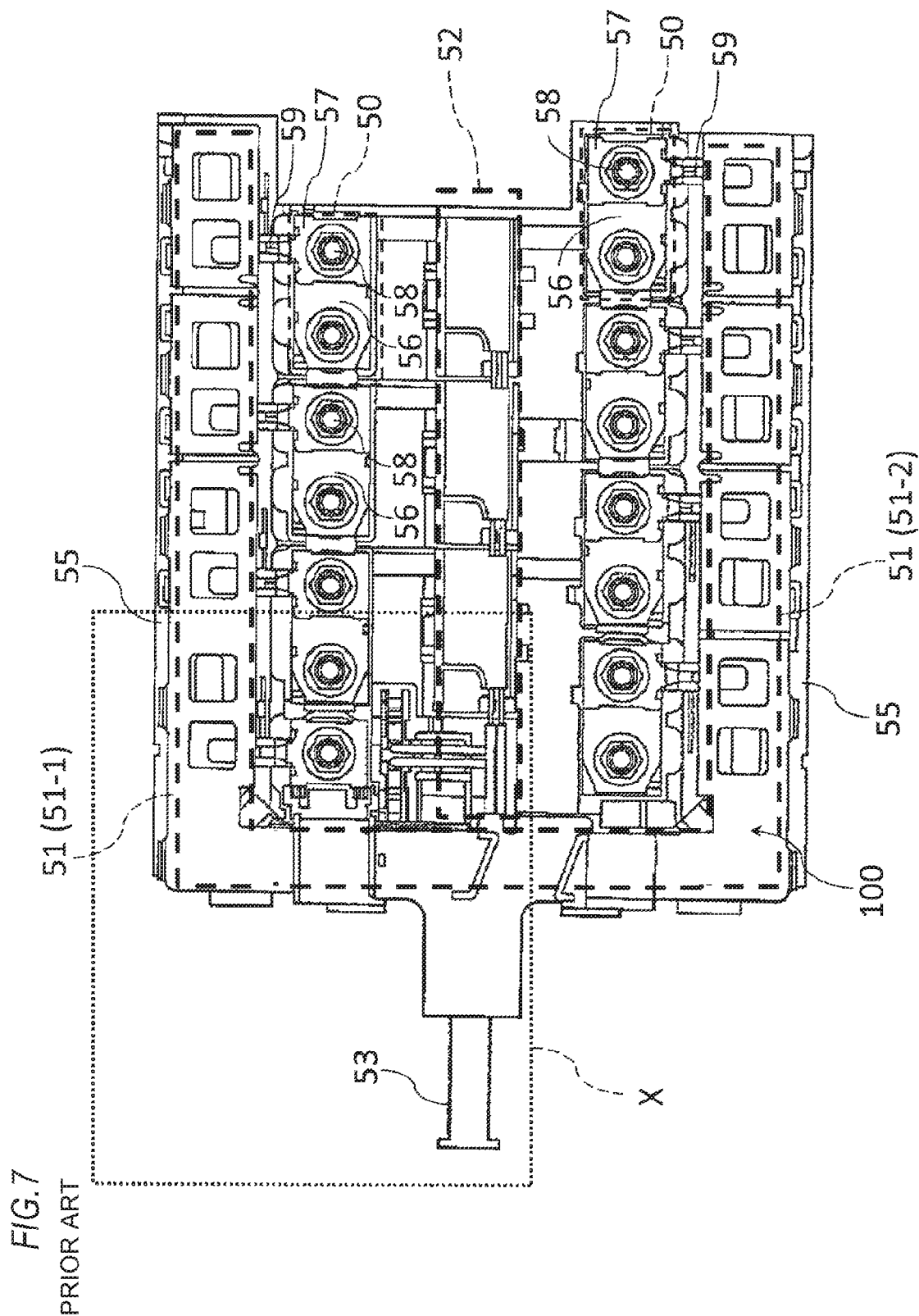
FIG. 7 is a plan view showing an electric wire routing structure for a bus bar module of the conventional art.
Figure 8:
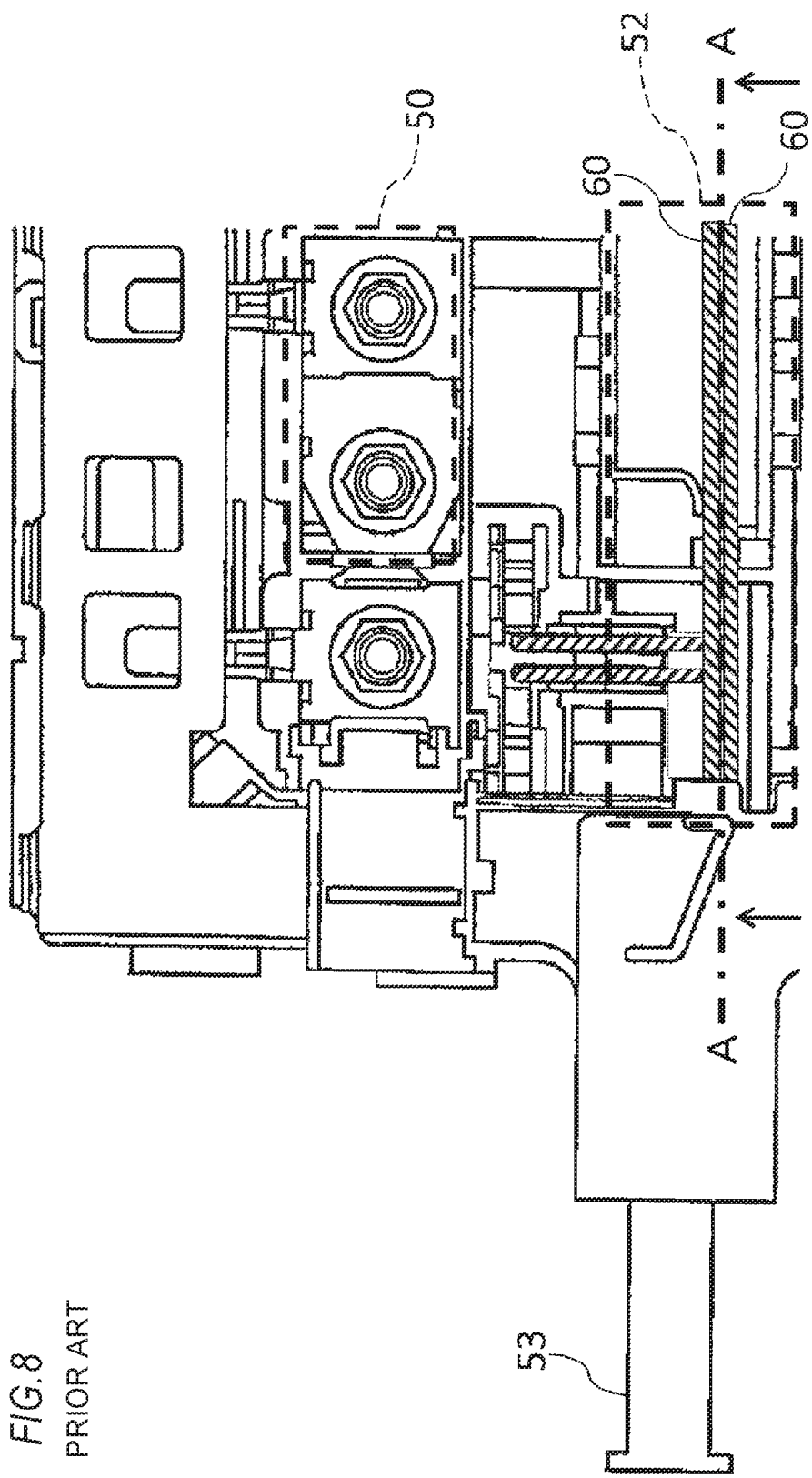
FIG. 8 is an enlarged view of X of FIG. 7.
Figure 10:
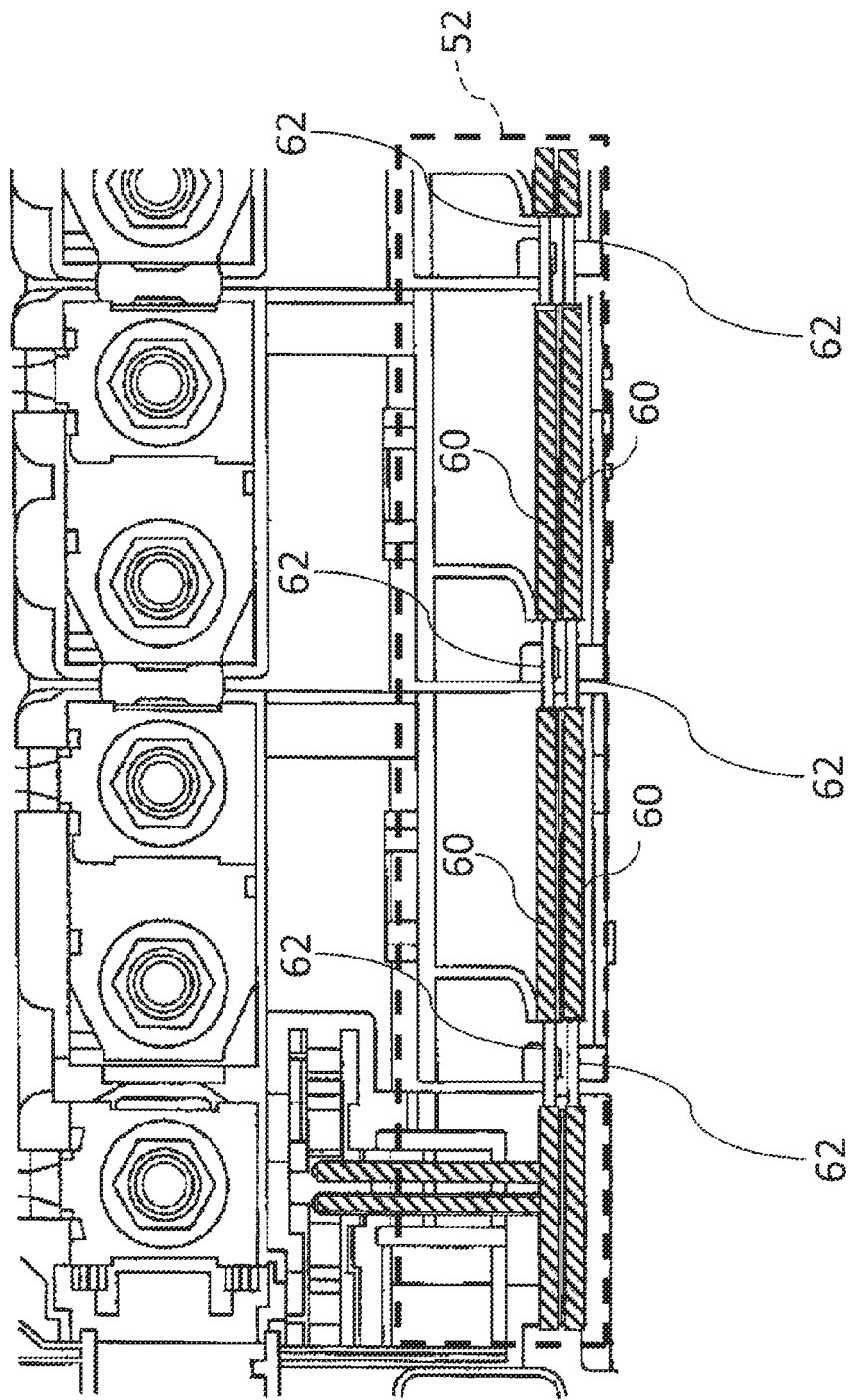
FIG. 10 is a top view of FIG. 9(b).

FIG. 6 is a diagram showing another example of wire routing of FIG. 3. In FIG. 3, the electric wire 5-3 is routed from the inner side electric wire accommodation part 7-3 to the electric wire routing part 11-3, and led to the first electric wire accommodation part (the outer side electric wire accommodation part) 71. Instead, as shown in FIG. 6, the electric wire 5-3 may be routed from the inner side electric wire accommodation part 7-3 through the electric wire routing part 9-3 to the electric wire routing part 11-4, and led to the second electric wire accommodation part (the outer side electric wire accommodation part) 72. The electric wire 5-5 is also led to the second electric wire accommodation part (the outer side electric wire accommodation part) 72. As a result, all electric wires 5 can be routed/collected to the second electric wire accommodation part (the outer side electric wire accommodation part) 72. This avoids the necessity of collecting all electric wires 5 in the extraction parts and hence makes easy the handling of electric wire bundles.

Further, the electric wire routing structure for the bus bar module of the present embodiment, the electric wire routing part 9 for accommodating the electric wire 5 extends in the transverse direction (in the arrow S direction in the figure) of the accommodation part 2 approximately in perpendicular to the first-group and second-group accommodation parts 21 and 22. Instead, the electric wire routing part 9 may extend in an oblique direction relative to the longitudinal direction and the transverse direction with a predetermined angle relative to the transverse direction. Further, in order that the electric wire routing part 9 may extend in the oblique direction, the linkage part 8 may link the first-group accommodation part 21 and the second-group accommodation part 22 to each other in an oblique direction relative to the longitudinal direction and the transverse direction.

Here, the features of the above-mentioned embodiments of the electric wire routing structure for the bus bar module according to the present invention are briefly listed below.

[1] An electric wire routing structure for a bus bar module including: a first-group accommodation part 21 in which accommodation parts 2 each of which accommodates at least one of a bus bar 3, a terminal 4, and an electric wire 5 connected to the terminal 4 are arranged; a second-group accommodation part 22 in which accommodation parts 2 each of which accommodates at least one of a bus bar 3, a terminal 4, and an electric wire 5 connected to the terminal 4 are arranged; a linkage part 8 located between the first-group accommodation part 21 and the second-group accommodation part 22 and linking the first-group accommodation part 21 and the second-group accommodation part 22 to each other; and an electric wire routing part 9 provided in the linkage part 8 and accommodating the electric wires 5.

[2] The electric wire routing structure for the bus bar module having the above-mentioned configuration [1], including: a first accommodation part 2-5 constituting the first-group accommodation part 21; and a second accommodation part 2-6 constituting the second-group accommodation part 22 and arranged opposite to at least a part of the first accommodation part 2-5, wherein the electric wire routing part 9-5 is provided in the linkage part 8-5 linking the first accommodation part 2-5 and the second accommodation part 2-6 to each other.

[3] The electric wire routing structure for the bus bar module having the above-mentioned configuration [2], including: a first electric wire accommodation part (an outer side electric wire accommodation part) 71 located on an outer side of the first-group accommodation part 21 and accommodating a plurality of the electric wires 5; a first extraction part 73 located in an end part of the first electric wire accommodation part (the outer side electric wire accommodation part) 71 and having a structure for extracting the plurality of the electric wires 5; a second electric wire accommodation part (an outer side electric wire accommodation part) 72 located on an outer side of the second-group accommodation part 22 and accommodating a plurality of the electric wires 5; and a second extraction part 74 located in an end part of the second electric wire accommodation part (the outer side electric wire accommodation part) 72 and having a structure for extracting the plurality of the electric wires 5, wherein the electric wire routing part 9-5 leads the electric wires 5 from the second-group accommodation part 22 to the first electric wire accommodation part (the outer side electric wire accommodation part) 71, or the electric wire routing part 9-5 leads the electric wires 5 from the first-group the accommodation part 21 to the second electric wire accommodation part (the outer side electric wire accommodation part) 72, the first extraction part 73 has a structure for extracting the electric wires 5 led from the second-group accommodation part 22 to the first electric wire accommodation part (the outer side electric wire accommodation part) 71, and the second extraction part 74 has a structure for extracting the electric wires 5 led from the first-group accommodation part 21 to the second electric wire accommodation part (the outer side electric wire accommodation part) 72.

[4] The electric wire routing structure for the bus bar module having the above-mentioned configuration [3], wherein the electric wire routing part 9-3 leads the one electric wire 5-4 from the second accommodation part 2-4 to the first electric wire accommodation part (the outer side electric wire accommodation part) 71, or the electric wire routing part 9-5 leads the one electric wire 5-5 from the first accommodation part 2-5 to the second electric wire accommodation part (the outer side electric wire accommodation part) 72.

Further, the present application is based on Japanese patent application (Patent Application No. 2012-189956) filed on Aug. 30, 2012. The contents thereof are incorporated herein by reference.

INDUSTRIAL APPLICABILITY

The electric wire routing structure for a bus bar module of the present invention has effects that handling of electric wire bundles in extraction parts are made easy and that even when the insulators of detection lines are eroded by high temperature gas discharged from a smoke exhaust valve in case of abnormality in a battery stack, a short circuit in the detection lines can be prevented. Thus, the electric wire routing structure is useful, for example, as an electric wire routing structure for a bus bar module provided in a linkage part for linking accommodation parts.

DESCRIPTION OF REFERENCE NUMERALS

1 Bus bar module
2 Accommodation part
3 Bus bar
4 Terminal
5 Electric wire
6 Nut
7 Inner side electric wire accommodation part
8 Linkage part
9, 11 Electric wire routing part
10 Battery stack
12, 13 Hinge
14-16 Protruding part
21 First-group accommodation part
22 Second-group accommodation part
71 Outer side electric wire accommodation part (First electric wire accommodation part)
72 Outer side electric wire accommodation part (Second electric wire accommodation part)
73, 74 Extraction part

The invention claimed is:

1. An electric wire routing structure for a bus bar module comprising:
   a first-group accommodation part in which accommodation parts each of which accommodates at least one of a bus bar, a terminal, and an electric wire connected to the terminal are arranged;
   a second-group accommodation part in which accommodation parts each of which accommodates at least one of a bus bar, a terminal, and an electric wire connected to the terminal are arranged;
   a linkage part located between the first-group accommodation part and the second-group accommodation part and linking the first-group accommodation part and the second-group accommodation part to each other;
   an electric wire routing part provided in the linkage part and accommodating the electric wires;
   a first accommodation part constituting the first-group accommodation part;
   a second accommodation part constituting the second-group accommodation part and arranged at a transversely opposite side of the routing structure than a side at which the first accommodation part is located;
   a first electric wire accommodation part located on an outer side of the first-group accommodation part and accommodating a plurality of first electric wires;
   a first extraction part located in an end part of the first electric wire accommodation part and configured to extract the first electric wires;
   a second electric wire accommodation part located on an outer side of the second-group accommodation part and accommodating a plurality of second electric wires; and
   a second extraction part located in an end part of the second electric wire accommodation part and configured to extract the second electric wires, wherein
   the electric wire routing part is provided in the linkage part linking the first accommodation part and the second accommodation part to each other,
   a transverse direction of the routing structure is perpendicular to a longitudinal direction of the routing structure,
   the electric wire routing part leads the second electric wires from the second-group accommodation part to the first electric wire accommodation part, or the electric wire routing part leads the first electric wires from the first-group accommodation part to the second electric wire accommodation part,
   the first extraction part is further configured to extract the second electric wires led from the second-group accommodation part to the first electric wire accommodation part,
   the second extraction part is further configured to extract the first electric wires led from the first-group accommodation part to the second electric wire accommodation part, and
   the outer side of the first-group accommodation part and the outer side of the second-group accommodation part are respective outer sides of the electric wire routing structure transversely opposite to each other.

2. The electric wire routing structure for the bus bar module according to claim 1, wherein the electric wire routing part leads one of the second electric wires from the second accommodation part to the first electric wire accommodation part, or the electric wire routing part leads one of the first electric wires from the first accommodation part to the second electric wire accommodation part.

* * * * *